(12) United States Patent
Kullborg

(10) Patent No.: US 6,795,750 B2
(45) Date of Patent: Sep. 21, 2004

(54) INDUSTRIAL ROBOT

(75) Inventor: Ove Kullborg, Vasteras (SE)

(73) Assignee: ABB AB, Vasteras (SE)

( * ) Notice: Subject to any disclaimer, the term of this patent is extended or adjusted under 35 U.S.C. 154(b) by 81 days.

(21) Appl. No.: 10/148,630

(22) PCT Filed: Nov. 30, 2000

(86) PCT No.: PCT/SE00/02389

§ 371 (c)(1),
(2), (4) Date: Sep. 9, 2002

(87) PCT Pub. No.: WO01/39933

PCT Pub. Date: Jun. 7, 2001

(65) Prior Publication Data

US 2003/0060929 A1 Mar. 27, 2003

(30) Foreign Application Priority Data

Dec. 1, 1999 (SE) .............................................. 9904356

(51) Int. Cl.[7] .......................... B25J 17/02; G05F 19/00
(52) U.S. Cl. .................... 700/245; 700/250; 74/490.06; 901/15; 901/29
(58) Field of Search ......................... 700/90, 245, 247, 700/250; 74/490.01–490.06; 901/1, 2, 15, 28, 29

(56) References Cited

U.S. PATENT DOCUMENTS

| 4,218,166 A | * | 8/1980 | Abu-Akeel et al. ............. 414/1 |
| 4,705,243 A | * | 11/1987 | Hartmann et al. ............. 248/51 |
| 5,225,648 A | * | 7/1993 | Torii et al. ............... 219/121.6 |
| 5,279,177 A | | 1/1994 | Inada ........................... 74/479 |
| 5,816,108 A | | 10/1998 | Obata et al. .................. 74/490 |

FOREIGN PATENT DOCUMENTS

EP 0 873 826 A2 10/1998

* cited by examiner

Primary Examiner—Jayprakash N. Gandhi
(74) Attorney, Agent, or Firm—Dykema Gossett PLLC

(57) ABSTRACT

The present invention concerns an industrial robot (1) comprising an upper arm (2) that can be rotated around a first axis (A), a wrist (6) supported by the upper arm that can be rotated around a second axis (B), a hollow turning device (3, 30) supported by the wrist that can be rotated around a third axis (C) that at its front end comprises a turning disk (8, 33) for attachment of a tool, at least one supply line (K) that runs along the upper arm, that the turning device (3, 30) comprises a collar section (10, 36) with a conical envelope surface (12, 45) attached to the turning disk (8, 33), through which at least one opening (14,40) is arranged for the reception of supply lines (K) that pass through the turning device, whereby the opening has an axial extension along a normal (16) perpendicular to the envelope surface (12), where the supply lines are arranged to run through the opening in a direction that has a component parallel to the third axis (C), which opening is arranged to control in a transverse direction and allow in a longitudinal direction displacement of the supply lines. The present invention relates also to a turning device for supply lines in an industrial robot with a robot arm that can be rotated, a method for drawing supply lines, use of the turning device in an industrial robot with a robot arm that can be rotated and use of the industrial robot or the turning device in a welding process.

15 Claims, 4 Drawing Sheets

INDUSTRIAL ROBOT

TECHNICAL AREA

The present invention relates to an industrial robot with a robot upper arm. The present invention also refers to a turning device for supply lines for an industrial robot with a rotatable robot arm, a method for drawing supply lines, use of a turning device on an industrial robot with a rotatable robot arm and use of the industrial robot or the turning device in a welding process.

THE PRIOR ART

It has become ever more common in industrial robots to allow the supply lines for process media, such as electrical power, cooling water, air or signals, for the tool to run internally within the upper arm of the robot. What is described as "supply lines" hereunder denotes one or more lines and/or wires for electricity, fluids, other media, etc., and it can also denote an empty flexible protective cover in which one or more lines or cables can be arranged. The said process media can, for example, be intended for point welding. The desired tool is attached to a tool connector at the free end of a robot upper arm. The tool connector is firmly attached to a rotatable device with bearings which in the subsequent text will be denoted by "the turning device". The said turning device comprises a forward disk-shaped section, also known as the turning disk, for the attachment of a tool to it. There exist today some standard sizes of the flange that constitutes the outermost forward part of the turning disk and that is used to attach a tool. The turning device also comprises a rear section, attached to the turning disk, that is mounted on bearings and arranged to rotate in a wrist on the robot upper arm. It is desirable that supply lines be drawn through all the said parts, such as the robot upper arm and the turning device, wholly or partially internally, within the robot. The lines are in this way protected from damage and breakage, at the same time as loose supply lines are avoided that get in the way around the working space of the robot. However, the supply lines are subject to both turning and bending during the various rotations of the respective parts. For example, a rotatable part of the wrist and simultaneously the turning device can each rotate +/−300° (in the description given here 300° denotes rotation through a complete circle), which is why the total twisting of supply lines that pass along these parts can be exposed to a twisting of 600°. What is known as a "tilt" movement (a bending) can achieve a movement of the supply lines of up to +/−120°. In order to reduce wear and to increase the lifetime of the supply lines, the supply lines should be firmly clamped as little as possible. This makes the supply lines easier to exchange. Supply lines may need to be exchanged as often as once a month during normal use. Supply lines should also possess a certain axial freedom of motion, between, for example, conductors (individual wires) in a line. Thus the supply lines should not be firmly clamped in the robot arm or be bent so severely that the said rotational movements are inhibited. In known solutions the supply lines are attached to connectors that are firmly fixed in the turning device, which connectors extend radially from the turning device and relative to the axis of rotation of the tool. The supply lines are in this way submitted to a very severe bending within the turning device and the robot arm. Too severe bending of the supply lines with a small radius of curvature gives rise to a significant risk of endurance fracture of parts that are included in the supply lines, such as, for example, copper conductors. Process supply lines require a relatively large radius of curvature, and it is therefore particularly important to exercise caution against too sharp and small bending radius of curvature of the supply lines when drawing process lines. In addition to this it can be mentioned that where the supply lines pass out through connectors in the turning device at the end of the robot arm the supply lines become extensive and bulky. Extensive supply lines encroach upon the working area and make access difficult in order to work in cramped spaces.

The drawing of supply lines essentially completely internally forwards through the turning disk and onwards to the tool is also known in a special design. This, however, is not desirable, since it must be possible to use different types of tool and a tool connector must be standard. Each user of industrial robots has specific desires concerning, for example, special tools that are to be used. The supply lines are for this reason normally drawn externally, on the outer surface of the tool connector/turning device and external to the robot arm at its forward part.

EP-A2-0873826 concerns an industrial robot comprising a wrist joint, comprising three wedge-shaped devices, in which a third wrist device has a flange with connectors for tools. Supply lines are arranged within the robot arm and are further arranged to be drawn out radially at the third wrist device, out of the wrist device. In this way, the supply lines are attached to connectors that are firmly fixed in the wrist device, which connectors pass radially outwards from the wrist device relative to the axis of rotation of the tool. The construction according to EP-A2-0873826 does not specify a solution to the problems that have been described according to the prior art above. These wrist devices do not permit a straight feed-through of supply lines. Supply lines that are subject to sharp bending in a right angle are subject to extreme loading, leading to a reduction in lifetime.

There has long existed a need within the industry to draw supply lines more directly along a robot arm. One function that has been sought-after for a long time is the ability to draw supply lines internally through the complete robot arm and turning device, whereby the supply lines are drawn right up to the turning disk of the turning device for further connection to a tool attached at the turning disk.

DESCRIPTION OF THE INVENTION

The present invention aims at achieving supply lines drawn simply in a robot arm for an industrial robot, which supply lines resist the mechanical loading that they are subject to during rotational movement of the robot arm whereby an increase in the lifetime of the supply lines can be achieved. Furthermore, the intention is to achieve an arrangement of supply lines that is simple, cost-effective, easy to mount or dismount and/or exchange, and easy to repair. A further aim is that at least the designs of the pathway of the supply lines, the tool attachment, etc., at the tool are to be made as compact and flexible as possible in order to make it possible for the robot to gain access to space-restricted work surfaces and in this way prevent the supply lines from encroaching onto the working space.

The solution is achieved with an industrial robot with the characteristics specified in claim 1. To be more precise, claim 1 according to the present invention relates to an industrial robot that comprises an upper arm that can be rotated around a first axis, a wrist that is supported by the upper arm and can be rotated around a second axis, a hollow turning device that is supported by the wrist and that can be rotated around a third axis and that at its forward end comprises a turning disk for attachment of a tool, at least one supply line that runs along the upper arm, whereby the turning device comprises a collar section with a conical envelope surface that is connected to the turning disk, through which is arranged at least one opening for the reception of a supply line that passes through the turning device, whereby the opening has an axial extension along a normal perpendicular to the envelope surface, where the supply line is arranged to pass through the opening in a direction that has a component parallel to the third axis, which opening is arranged to control in a transverse direction and to allow in a longitudinal direction displacement of the supply line. Since the supply line is arranged through the collar section in a direction that has a component parallel to the third axis, a more advantageous, straighter and more compact pathway for the supply line is achieved. The solution according to the invention means that it is easier to gain access with the tool to work on smaller surfaces since the pathway to the tool of the supply line on the outside of the robot arm will be less extensive and bulky. The present invention allows the supply lines to be allowed to carry out a relatively large rotational motion without risk of limiting the motion or endurance failure. Since the supply lines are not clamped down in the turning device, the supply lines are allowed to be controlled transversely and displaced longitudinally. This leads to less wear on, and less damage to, the supply lines. It also means that tangling of the supply lines is avoided and the risk for breakages of the supply lines is reduced. The present invention ensures that the supply lines are subject to a significantly less severe bending through openings in the turning device. This significantly reduces the risk that the supply lines become broken. In this way, the lifetime of the supply lines is increased. Through the present invention, a simple and efficient method is achieved for exchange of supply lines, since the supply lines are firmly fixed at few places in the robot upper arm and the supply lines can be simply drawn out through openings in the turning device, when necessary. A further advantage is that different users of industrial robots can rapidly and easily install a desired set of supply lines, such as, for example, welding supply lines, tool supply lines, a water line or a compressed air line.

The present invention also comprises a turning device for an industrial robot for control of supply lines through an upper arm to an industrial robot, with the characteristics specified in claim 7, which turning device at its forward end comprises a turning disk for attachment of a tool, whereby the turning device comprises a collar section with a conical envelope surface connected to the turning disk, through which at least one opening is arranged for reception of a supply line that passes through the turning device, whereby the opening has an axial extent along a normal that is perpendicular to the surface of the envelope, where the supply line is arranged to pass through the opening in a direction that has a component parallel to an axis of the turning device, which opening is arranged to control in a transverse direction and to allow in a longitudinal direction displacement of the supply line. The turning device according to the present invention can be applied in different types of industrial robot. It is preferable that the turning device is arranged to rotate on an industrial robot comprising an upper arm that can be rotated around a first axis, a wrist that is supported by the upper arm and that can be rotated around a second axis, and where the rotatable turning device is supported by the wrist in a hollow manner around a third axis.

With the turning device for supply lines according to the present invention, the rotating arm part can demonstrate rotational motions of up to at least +/−300°, without the supply lines becoming tangled or a breakage being caused, which gives less wear on the supply lines. When the robot arm is turned, or rotated, to its final end position, for example, 300° or more in one direction, the supply lines are consequently maximally stretched. Thus it is required that the supply lines should be slack in the initial position of the robot arm, before a rotational motion. Supply lines can thus be slack in that part of the supply lines that is inside and/or outside of the robot upper arm. "Slack" is here used to denote the situation in which the supply lines can be hanging loosely and not under tension.

It is appropriate to arrange supply lines in openings, cavities or channels within the robot upper arm. As has previously been mentioned, one aim of the present invention is to be able to draw supply lines for the most part internally, inside the robot upper arm, for their complete length through cavities in a rear section of the turning device, and onwards out to the turning disk where the supply lines can pass out adjacent to the tool connector through openings, in the collar section. In this way an essentially extended and straight channel is formed for supply lines through the robot upper arm and the turning device. In this way the supply lines obtain an essentially straight passage through the robot upper arm.

It is appropriate if the collar section is arranged between, and in direct contact with, the forward disk-shaped turning disk and a rear section of the turning device. The collar section, which is designed to be in contact with the turning disk, can have a envelope surface of freely chosen form such as, for example, concave or convex. However, it is important according to the present invention that the supply lines are arranged to run through an opening in the collar section in a direction that has a component parallel to the third axis, that is, in a direction obliquely forwards towards the tool. The collar section is preferably designed with a conical envelope surface, and can be constituted by a cone that is cut off at the tip. It is appropriate to arrange at the base of the cone a body that is constituted by a sleeve-shaped section that serves as a bearing mount for a bearing in a wrist attached to the robot arm.

The number of openings in the collar section can vary from a few to several. The openings can also be called "channels" in consideration of the fact that the walls of the collar section have a certain thickness, whereby a channel is formed through penetration from the inner surface of the collar section to its outer surface (the envelope surface).

The turning device can be designed in any freely chosen material such as steel, aluminum or plastic.

It is appropriate to terminate the turning device as a conical toothed wheel, divided or whole. "Divided" is used to denote that the turning device can comprise several parts that are attached to each other in the robot. This solution provides, among other things, ample space for the bending of the supply lines. A divided turning device can thus in this way, for example, be comprised of a forward part such as a turning disk and a collar section with a rear contact surface provided with a thread, which surface is firmly screwed into an equivalent rear threaded part of the turning device. The rear part is, for example, connected by a suitable method to toothed wheel gearings and a motor that drive and transfer rotational motion to the turning device. Other technical characteristics concerning a conical toothed wheel, with respect to, for example, openings in the turning device and the angle of inclination of the conical envelope surface, can agree with the characteristics described here for the turning device.

The supply lines are arranged to pass through the opening in a direction that has a component parallel to the third axis. A normal can be defined at that point on the envelope surface of the collar section where the supply line leaves the opening, that is, a direction at the said point that is perpendicular to the envelope surface of the collar section. In this way, the opening and the supply line that passes through it have an angle of inclination between the third axis and the normal to the envelope surface the lies under 90°. The said third axis is the axis of rotation of the tool, which is attached to the turning disk. It is appropriate if the normal to the envelope surface, that is, an axis perpendicular to the envelope surface, has an extension in length that essentially agrees with an axial extension of the openings that pass through the turning device. Thus the respective openings each have an extension in length that extends along a normal to the envelope surface. It is appropriate if the angle of inclination between the third axis and the normal is in the interval from 0° to 60°, and preferably within the interval from 0° to 44°. A supply line that extends through an opening has at the position of the opening at least one axial component of direction, a component parallel to the third axis. If the angle of inclination exceeds 0°, the supply line also has a directional component in a radial direction. When the angle of inclination is 0°, the envelope surface is for the most part arranged perpendicular relative to the third axis. The openings then have straight feed-through forwards in the direction of extension of the collar section.

The present invention also relates to a method for drawing supply lines in an industrial robot with the characteristics specified in claim 12, comprising an upper arm that can be rotated around a first axis, a wrist supported by the upper arm that can be rotated around a second axis, a hollow turning device supported by the wrist that can be rotated around a third axis and that at its forward end comprises a turning disk for attachment of a tool, whereby at least the supply lines are brought to run along the upper arm, and that the turning device communicates with a collar part with a conical envelope surface that is attached to the turning disk, wherein at least one opening is arranged, whereby the opening has an axial extension along a normal perpendicular to the envelope surface, that the supply lines are brought to pass through the opening, that the supply lines are brought to pass through the opening in a direction that has a component parallel to the third axis, and that the supply lines are brought in the opening to be controlled in a transverse direction and allowed a displacement in a longitudinal direction.

The present invention also comprises the use of a turning device on an industrial robot with a rotatable upper arm, according to that which is made clear by claim 16, in order to control in a transverse and in a longitudinal direction at least one line therein.

It is appropriate to use the industrial robot and the turning device according to the present invention for work in welding processes, such as, for example, point welding. The present invention therefore also relates to the use of the said industrial robot or turning device, according to that which is made clear by claim 17, in a welding process.

The industrial robot described, which can also be termed a "manipulator with control device", according to the present invention is of a type intended for managing to bear weights up to at least 150 kg. It is appropriate that the industrial robot according to the present invention is of a type in which the robot upper arm and the rotation axes of the robot are driven by toothed wheel gearings via motors. It is appropriate that the motors in such a type of robot upper arm are located at the toothed wheel gearings, that is, in the forward outer part of the robot upper arm by the wrist and the turning device, and it is appropriate if they are arranged inside these parts.

DESCRIPTION OF THE DRAWINGS

The invention will now be described in more detail in the form of a non-limiting embodiment, illustrated with the aid of the attached drawings, where.

DESCRIPTION OF EMBODIMENTS

Figure 1:
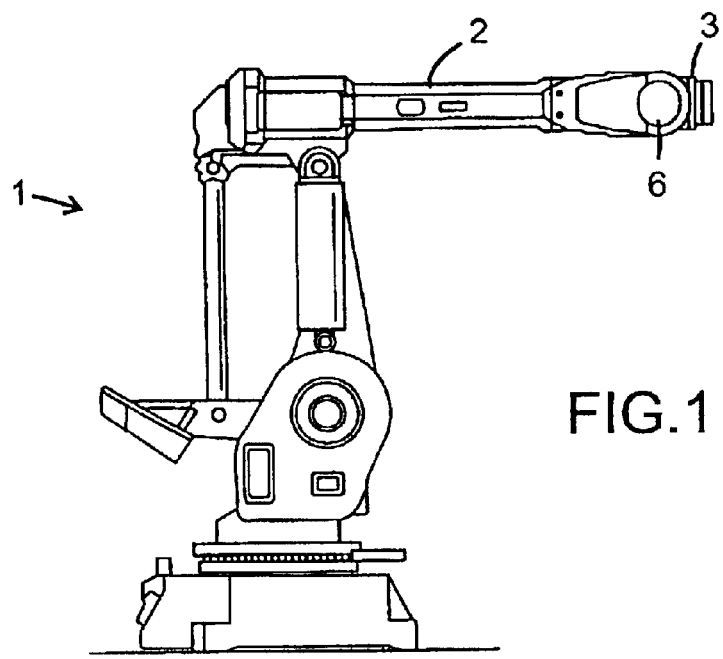
FIG. 1 shows a general sketch of an industrial robot according to the present invention.
Figure 2:
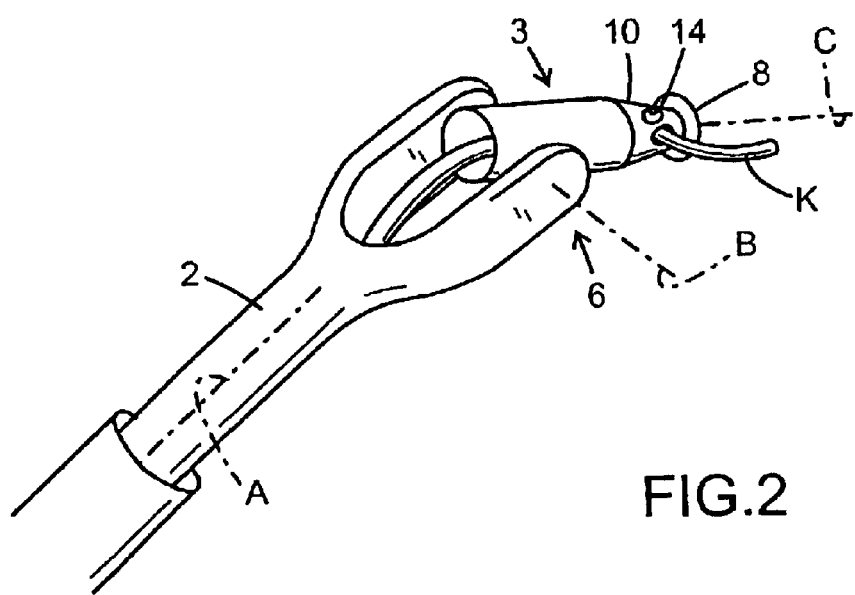
FIG. 2 shows in principle the pathway of the supply lines through a robot upper arm and turning device according to the present invention.

FIG. 1 illustrates an industrial robot 1 comprising a rotatable robot upper arm 2, which at its free end supports a rotatable turning device 3 rotatably arranged in a wrist 6 (which section of the arm is often referred to as a "fork"). FIG. 2 shows in principle (essentially in agreement with the industrial robot that is shown in FIG. 1) how a supply line K is drawn through the robot upper arm 2 and the turning device 3 on an industrial robot according to the present invention. The supply line K is arranged to pass through an opening 14 in a collar section of the turning device 3. The industrial robot comprises an upper arm 2 that can be rotated around a first axis A, a wrist 6 supported by the upper arm that can be rotated around a second axis B, a hollow turning device 3 supported by the wrist that can be rotated around a third axis C that at its forward end comprises a turning disk 8 for attachment of a tool. The first axis A crosses the second axis B perpendicularly, and the second axis B crosses the third axis C perpendicularly. A collar section 10 is arranged between, and in direct contact with, the forward disk-shaped turning disk 8, and a rear section 17 of the turning device 3.

Figure 3:
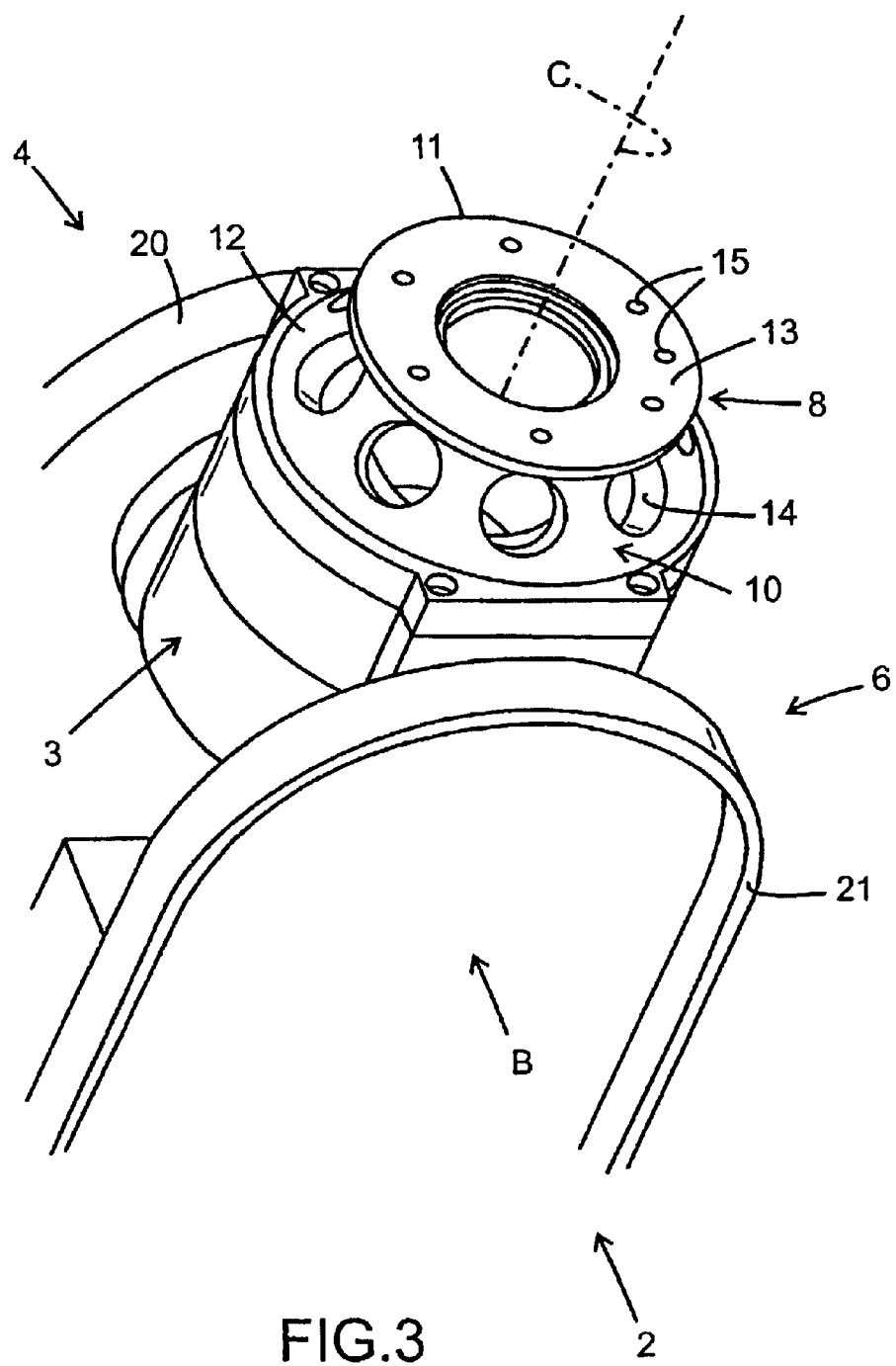
FIG. 3 shows in perspective view the free end of a robot upper arm according to the present invention.
Figure 4:
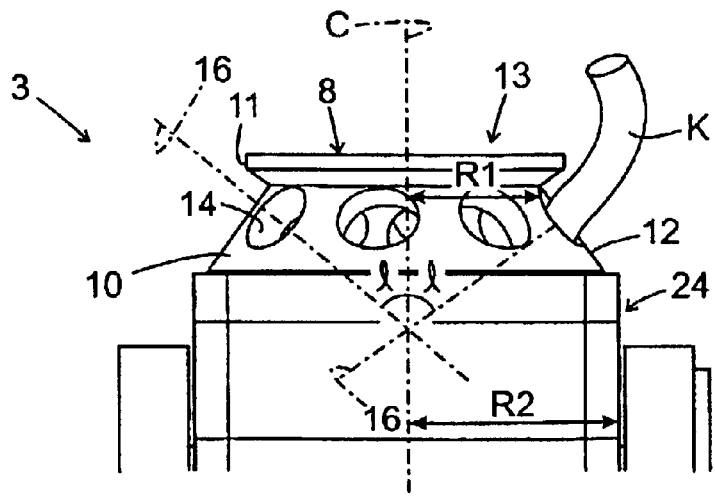
FIG. 4 partly shows in a view directly from the side the turning device on the free end of the robot upper arm in FIG. 3, with a supply line drawn through a collar section.
Figure 5:
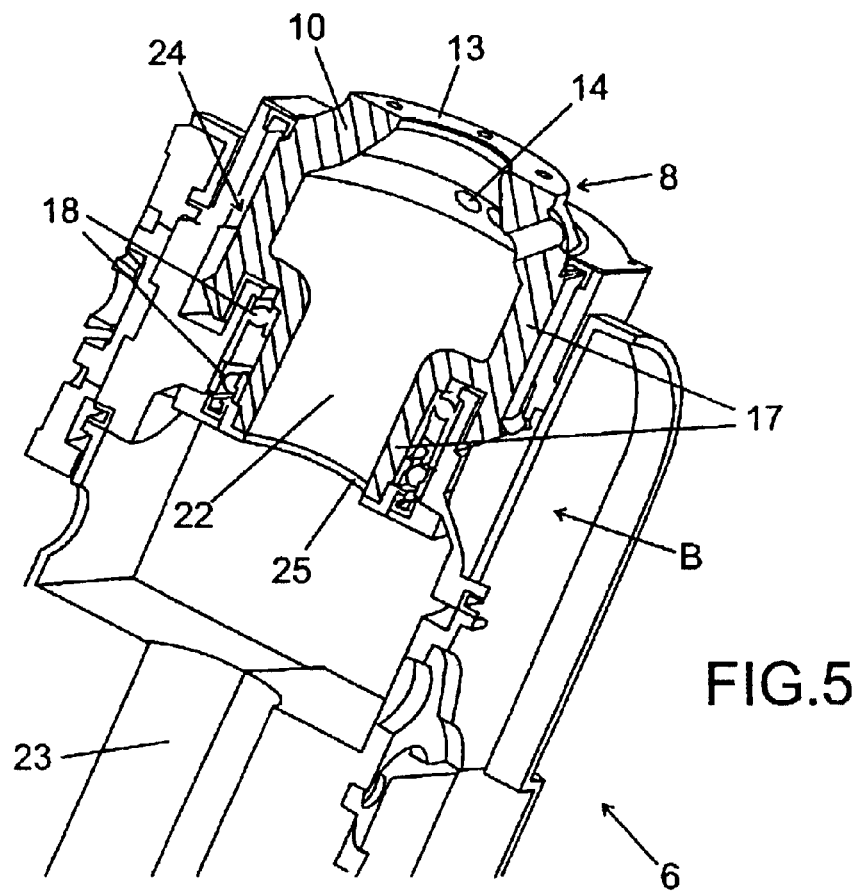
FIG. 5 shows, in a perspective view, a cross-section through the free end of an embodiment of the robot upper arm according to the present invention.

FIG. 3 and FIG. 4 show an industrial robot with a rotatable hollow upper arm 2, comprising two formed arm parts 20, 21 (also known as a "fork"), where a turning device 3 is arranged at the free end 4 of the robot upper arm 2 between the arm parts 20, 21, which turning device is rotatable (that is, it can perform a bending/tilt motion) in a wrist 6 around a second axis B (the tilt axis). The turning device 3 comprises a rear sleeve-shaped section 17 (as is shown in FIG. 5) and a forward disk-shaped section that is termed "the turning disk" 8. A collar section 10 is arranged between, and in direct contact with, the forward disk-shaped turning disk 8 and the rear section 17 of the turning device 3. A rotational motion is transferred to the turning device 3 with the aid of motors and toothed wheel gearings not shown in the figures. A supply line K is intended to be arranged and run along and inside of the robot upper arm 2, onwards through a central opening 22 (or cavity) in the rear section 17 of the turning device 3, and onwards to the turning disk 8 (see FIG. 3). The rear section 17 and the opening 22 form in this way a cylindrical body 24. The turning device 3 can be rotatated around a third axis C. A tool is attached to the turning disk 8 via a surface 13 that constitutes a tool connector, in front of a flange 11. The tool connector 13 is equipped with means 15 for the rigid attachment of a tool to the connector 13. The turning disk is at its first end designed with a conical envelope surface 12 and the collar section 10 comprises feed-through openings 14 each of which has an axial extension along its respective normal 16, perpendicular to the envelope surface 12. A supply line K is thus intended to be drawn through the robot upper arm 2, onwards through the central opening 22 of the turning device and out through an opening 14 in the collar section 10. FIG. 4 also makes clear an angle of inclination α between the third axis C and the normal 16. This angle of inclination α lies below 90° and the openings 14 in the collar section 10 are arranged to control transversely and longitudinally at least one cable therein, whereby a supply line obtains a relatively straight through-passage through the turning device and out through the openings 14 in the collar section. According to the invention, the supply line should not be attached within the robot arm and should be able to move along the direction of its longitudinal axis, at least at the free, outer end of the robot arm, that is, at the collar section 10 and the wrist 6. The supply line can, however, be firmly attached at some position, and then, for example, one suitable location is next to or in the openings 14 in the collar section 10. The number of openings in the collar section can vary from one individual to approximately ten openings, and it is appropriate if they are symmetrically placed around the envelope surface of the collar section. The collar section 10 comprises at least one section with a radius $R_1$, defined between the third axis C and the envelope surface 12 of the collar section (see FIG. 4) that is less than the radius $R_2$ of the cylindrical body 24.

FIG. 5 shows a perspective view of an embodiment of the present invention in which the free end of a robot overarm (essentially in agreement with the device according to FIGS. 1–4) with the turning device 3 arranged to rotate (that is, able to perform a tilt/bending movement) around the second axis (the tilt axis) B. The turning device 3, which has a central opening 22, comprises a turning disk 8 and a rear sleeve-shaped section 17 (here in an undivided embodiment in a continuous body) that is arranged to rotate with the aid of bearings 18 in a bearing carrier 19 arranged in the wrist 6. An angle of inclination α between a third axis C and a normal to the envelope surface 25 is marked in FIG. 4. As has been mentioned earlier, the angle of inclination can preferably lie within the interval from 0° to 44°. In this way, the supply lines can obtain a relative straight through-passage through an opening 23 (or a channel) at the free end of a robot overarm, forwards to a tool connector 13, in that the supply lines pass internally in openings 22 in the hollow sleeve-formed section 17 of the turning device 3 and out through openings 14 in the collar section 10, where the through-passages in the openings are arranged in a direction obliquely forwards. The respective lines that are part of a supply line, or a bunch of supply lines of several lines/wires, can in this way be placed each in respective openings 14, whereby the lines are held apart, transversely controlled and displaceably arranged with respect to each other. The openings 14 are larger than the lines intended to be placed there, whereby the respective line in the supply line can still freely move and freely run in an axial direction through the openings 14. There is thus a certain amount of free space for a line in the opening. It is thus important that friction between the surrounding walls in the opening and a line passing though it is low.

Figure 6:
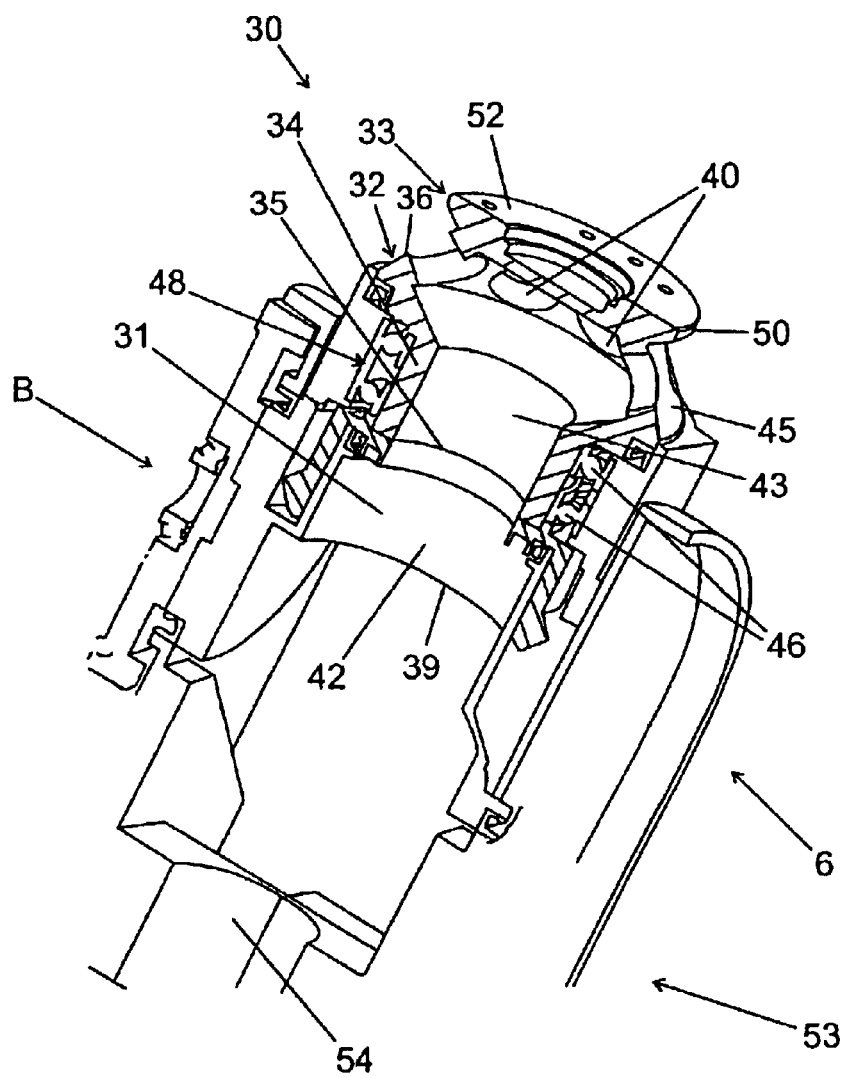
FIG. 6 illustrates, in a perspective view, a cross-section of an embodiment of the free end of a robot upper arm according to the present invention.

FIG. 6 illustrates an embodiment (essentially in agreement with the device according to FIGS. 1–2) in which the turning device 30 is in the form of a divided conical geared wheel. The divided turning device comprises two parts, a forward part 32 comprising a turning disk 33 and a sleeve-shaped rear part 34. The forward part 32 is attached to a rear sleeve-shaped body 31 of the turning device, which has contact surfaces that are arranged in contact with each other 35 during arrangement of the turning device 30 in the robot arm. A divided turning device gives more space for the bending of the supply lines. The reason is that it makes it possible for a bearing 46 for the turning motion around the axis B to be placed in the forward part of the turning device 30. This is advantageous from the point of view of durability. The rear opening 39 of the turning device 30 is placed in front of the axis of rotation B, which gives a more advantageous bending of the supply lines. The centre of rotation for the turning device 30 according to this embodiment thus lies further back along the robot arm 2, behind the turning device 30. This is to be compared with the embodiment according to FIG. 5 in which the rear opening 25 of the turning device 3 is placed behind the axis of rotation B. Thus, in comparison with the turning device 30 in FIG. 6, the centre of rotation of the turning device 3 in FIG. 5 lies further forward towards the free end 4 of the robot arm 2, within the turning device itself. Openings 40 are designed that pass through the conical envelope surface 45 of a collar section 36. The rear body 31 of the turning device has a contact surface equipped with teeth that are in toothed engagement with an equivalent tooth-equipped contact surface of a toothed wheel gearing arranged in the wrist, which toothed wheel gearing is arranged to transfer a rotational motion to the turning device via a motor. The turning device 30 has a central opening 42. Furthermore, the turning device 30 is arranged to rotate around a tilt axis 44 arranged in the wrist 6. The turning device is supported by bearings 46 in a bearing support 48. A tool is connected to the turning disk at a surface that constitutes a tool connector 52, in front of a flange 50. Supply lines are arranged through openings 40 in the collar section 36. A supply line, not shown, is drawn internally with essentially straight-through passage through openings 54 (channels) in the robot upper arm, and onwards through central openings 42, 43 in the turning device. Any other technical properties with respect to, for example, openings and the angle of inclination at the envelope surface of the collar section lying below 90, can agree with those described above for the turning device 3 with reference to FIGS. 3 and 4.

What is claimed is:

1. An industrial robot comprising an upper arm that can be rotated around a first axis, a wrist supported by the upper arm that can be rotated around a second axis, a hollow turning device supported by the wrist that can be rotated around a third axis that at its forward end comprises a turning disk for connection of a tool at least one supply line that runs along the upper arm, wherein the turning device comprises a collar section with a conical envelope surface attached to the turning disk, through which at least one opening is arranged for the reception of supply lines that pass through the turning device, whereby the opening has an axial extension along a normal perpendicular to the envelope surface, and wherein the supply lines are arranged to run through the opening in a direction that has a component parallel to the third axis, which opening is arranged to control in a transverse direction and allow in a longitudinal direction displacement of the supply lines.

2. The industrial robot according to claim 1, wherein the first axis crosses the second axis at right angles, and wherein the second axis crosses the third axis at right angles.

3. The industrial robot according to claim 1, wherein the collar section comprises at least one section that has a radius ($R_1$), defined between the third axis and the envelope surface of the collar section, that is less than a radius ($R_2$) of a rear section of the turning device.

4. The industrial robot according to claim 1, wherein the turning device has a central opening, wherein the supply lines extend completely within the central opening in the robot upper arm and within the turning device as far as the turning disk and wherein the supply lines are arranged to extend through openings in the collar section.

5. The industrial robot according to claim 1, wherein the turning device comprises a conical geared wheel in divided execution.

6. The industrial robot according to claim 1, wherein an angle of inclination ($\alpha$) between the third axis and the normal to the envelope surface of the collar section lies within the interval from 0° to 60°.

7. A turning device for control of supply lines through an upper arm of an industrial robot the turning device having a turning disk at its forward end for attachment of a tool, wherein the turning device comprises a collar section with a conical envelope surface attached to the turning device, through which is arranged at least one opening for the reception of the supply lines running through the turning device, wherein the opening has an axial extension along a normal perpendicular to the envelope surface and wherein the supply lines are arranged to run through the opening in a direction that has a component parallel to an axis o the turning device, the opening being arranged to transversely control and longitudinally allow displacement of the supply lines.

8. The turning device according to claim 7, wherein the collar section comprises t least one section that has a radius ($R_1$), defined between the axis of the turning device and the envelope surface of the collar section, that is less than a radius ($R_2$) of a rear section of the turning device.

9. The turning device according to claim 7, wherein a rear section of the turning device is sleeve-shaped.

10. The turning device according to claim 7, wherein the turning device comprises a conical toothed gear wheel in divided execution.

11. The turning device according to claim 7, wherein the turning device is rotatable about the axis thereof, and wherein an angle of inclination between the rotation axis and the normal lies within the interval from 0° to 60°.

12. A method for extending supply lines for an industrial robot comprising an upper arm rotatable about a first axis, a wrist supported by the upper arm and rotatable about a second axis, a hollow turning device supported by the wrist and being rotatable about a third axis that at its front end comprises a turning disk for connection of a tool, the supply lines extending along at least the upper arm, the method comprising the steps of communicating a turning device with a collar section having a conical envelope surface attached to the turning disk, the collar section having at least one the opening having an axial extension along a normal perpendicular to the envelope surface extending the supply lines through the opening which includes extending the supply lines through the opening in a direction that has a component parallel to that third axis, wherein the supply lines extend through the opening to be guided transversely and are allowed to be displayed longitudinally.

13. The method according to claim 12, wherein the first axis crosses the second axis at right angles, and the second axis crosses the third axis at right angles.

14. The Method according to claim 12, wherein the collar section comprises at least one section that has a radius ($R_1$), defined between the third axis and e envelope surface of the collar section, that is less than a radius ($R_2$) of a rear section of the turning device.

15. The method according to claim 12, wherein the turning device has a central opening, comprising the further step of extending the supply lines completely inside the openings in the robot upper arm and the turning device as far as the turning disk, where the supply lines are arranged through openings in the collar section.

* * * * *